United States Patent [19]

Maeda et al.

[11] Patent Number: 5,237,575

[45] Date of Patent: Aug. 17, 1993

[54] ERROR CORRECTION CODED DIGITAL DATA REPRODUCING APPARATUS

[75] Inventors: Yasuaki Maeda; Yuji Arataki, both of Tokyo, Japan

[73] Assignee: Sony Corporation, Tokyo, Japan

[21] Appl. No.: 825,535

[22] Filed: Jan. 24, 1992

[30] Foreign Application Priority Data

Jan. 25, 1991 [JP] Japan ................................. 3-025566

[51] Int. Cl.⁵ .............................................. G06F 11/10
[52] U.S. Cl. ................................... 371/40.1; 371/38.1
[58] Field of Search .................. 360/32, 51; 371/38.1, 371/39.1, 40.1, 44, 45

[56] References Cited

U.S. PATENT DOCUMENTS 5,050,171  9/1991  Ishijima .............................. 371/39.1
5,051,998  9/1991  Murai et al. ........................ 371/40.1

Primary Examiner—Vincent P. Canney
Attorney, Agent, or Firm—Philip M. Shaw, Jr.

[57] ABSTRACT

A data reproducing apparatus for reproducing main data from a disc on which a data string comprised of main data and auxiliary data appended to the main data at intervals of predetermined lengths of the main data, which main data are previously error correction coded input digital data. The main data are separated from data read from the disc and error-corrected in a decoder. The error-corrected data are stored in a memory. The data stored in the memory are continuously read by a readout control circuit. Data patterns before and after connecting portions of the main data written in or read from the memory are compared in a comparator and the next data are continuously reproduced at a time point when the data pattern coincidence is detected in the comparator.

7 Claims, 3 Drawing Sheets

ERROR CORRECTION CODED DIGITAL DATA REPRODUCING APPARATUS

BACKGROUND OF THE INVENTION

1. Field of the Invention

This invention relates to a data reproducing apparatus for reproducing main data from a disc where the main data are previously processed from input digital data by error correction coding and recoded on the disc along with auxiliary information data which are appended to the main data at predetermined intervals in the main data.

2. Description of the Related Art

Heretofore, there has been known a signal format for a so-called compact disc (CD) as a format in which PCM data are error correction coded and added to by auxiliary information data before being recorded on an optical disc. With this signal format, PCM digital audio data as main data are error correction coded by cross-interleave Reed-Solomon code (CIRC) and added to by sub-code data as auxiliary information data.

When PCM digital audio data recorded on a compact disc CD after error correction coding in accordance with the above signal format are reproduced by a conventional playback system, 8 to 14 demodulated binary signals are reproduced, and clocks are detected or reproduced on the basis of the binary signals by a phase locked loop (PLL). The frequency of these clocks, referred to hereinafter as PLL derived clocks, is 7.35 kHz×588=4.3218 MHz. In the conventional playback system, the binary data are reproduced by the PLL derived clocks so as to be processed by 8–14 demodulation.

The 8 to 14 demodulated data are processed by error correction and detection on the basis of the CIRC so that the data are corrected for errors. The error corrected data are subsequently processed by digital to analog conversion and thereby converted into analog audio signals.

Meanwhile, the above mentioned error correction coded data are usually error correction decoded by mean of a RAM used as a decoder. That is, the 8 to 14 demodulated data are written in the RAM used as the decoder so as to be subsequently demodulated by controlling the readout addresses of the RAM. In general, the write addresses for the RAM are formed on the basis of the above mentioned PLL derived clocks, whilst the readout addresses are based on clocks derived from an external circuit, such as a quartz oscillator.

However, the PLL derived clocks, formed on the basis of binary signals reproduced from the disc, as mentioned hereinabove, are affected by jitters caused by disturbances, such as motor revolutions or disc offsets. Conversely, the clocks derived from the quartz oscillators are substantially free from jitters. The result is that there exists a time difference corresponding to these jitters between the PLL derived clocks and the clocks derived from the quartz oscillator.

Meanwhile, there is known a system in which data are sequentially stored in a buffer RAM during ordinary reproduction so as to be read out in the event of data failure due to readout errors or defocusing of the optical pickup by way of compensation for the data failure. That is, in accordance with this system, data are readout from the disc at a fast rate in a burst fashion so as to be written sequentially in the buffer RAM, from which the data are continuously read, while the write addresses are controlled so that the neighboring data maybe continuously stored in the RAM, by way of compensation for possible data failure caused by the readout errors of defocusing of the optical pickup.

It is noted that data writing in the buffer RAM with this system is performed at a subcode Q time of the so-called CD format, that is, at an interval of one frame or 13.3 millisecond, while data readout is effected continuously at an ordinary playback rate. For this reason, the data writing rate in the buffer RAM needs to be faster than the readout rate. That is, since it is necessary to effect data writing in the RAM at a rate faster than the rate necessary to produce playback audio signals, the rotational speed of the disc is set with the above system to, for example, twice or three to four times the reference speed.

Meanwhile, the main data, such as the above mentioned digital audio data, are constituted only by PCM data and are destitute of timing data. If, for this reason, the subcode having the time information is used and the main data are divided at the subcode timing (so-called subcode Q time) for being written in or read from the buffer RAM, reproducible division points can not be obtained due to the above mentioned jitter, such that data written in the RAM are overlapped or dropped in amounts corresponding to the jitter. That is, if the digital audio data as contiguous main data segments are combined in the buffer RAM at the subcode timing, as mentioned hereinabove, it is not possible to produce fully reproducible division points, so that sound skipping or overlapping is inevitably produced.

OBJECTS AND SUMMARY OF THE INVENTION

It is an object of the present invention to provide a data reproducing apparatus in which contiguous main data segments of main data read from a disc, on which data re recoded in accordance with the CD format, may be combined without producing data overlapping or dropout, and which is strong against vibrations.

In accordance with the present invention, there is provided a data producing apparatus for reproducing main data from a disc on which a data string comprised of said main data and auxiliary data appended to said main data at intervals of predetermined lengths of the main data, said main data being previously error correction coded input digital data, comprising a decoder for separating said main data from said data string read from said disc for effecting error correction on the separated main data, a first memory for sequentially storing an output from said decoder, readout control means for continuously outputting data stored in said first memory, comparator means for comparing data patterns of main data portions previously stored in said first memory and main data portions to be entered next to said first memory for detecting coincidence therebetween, and memory control means for causing the main data portions entered next to the first memory to be stored in continuation to the main data portions previously stored in said first memory at the time point of coincidence detection.

The above and other objects and advantages of the present invention will become more apparent from the following description.

DESCRIPTION OF THE PREFERRED EMBODIMENTS

Figure 1:
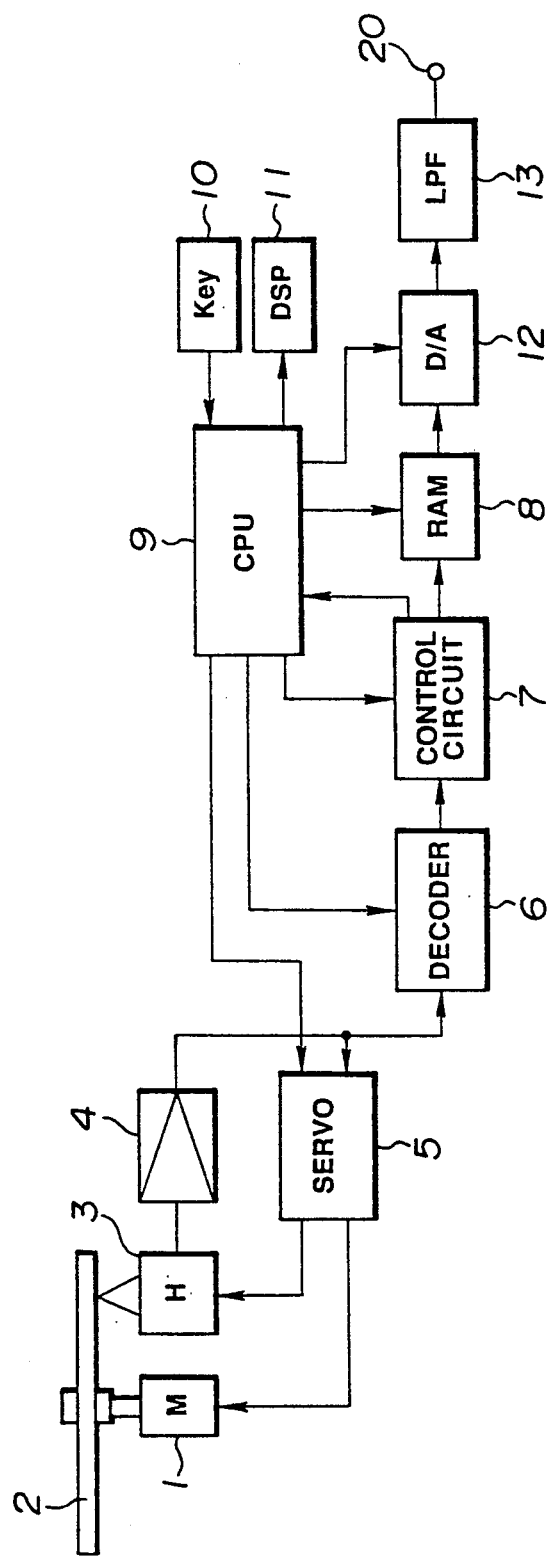
FIG. 1 is a schematic block diagram showing a data reproducing apparatus according to a present invention.

Referring to the drawings, preferred embodiments of a data reproducing apparatus according to the present invention will be explained in detail.

With the data reproducing apparatus, shown in FIG. 1, main data (audio data), which are PCM digital audio data processed with error correction coding by CIRC, and subcode data appended to the main data as auxiliary information inclusive of the absolute time information for the main data, such as so-called subcode Q time data, according to the so-called CD format, are previously recorded on a disc 2. The main data and the subcode data are reproduced in a burst fashion from the disc 2 and the read/write of the main data from or in the RAM 8 is controlled in decoding the error correction code. In a control circuit 7 of the data reproducing apparatus, data patterns preceding and succeeding a connection portion of data written in or read from RAM 8 are compared in a comparator 73 for detecting data coincidence. Data being rad from or written in the RAM 8 are connected at a time point of detection of the data coincidence, that is, on reception of a coincidence detection output from the comparator 73. In this manner, data in which data coincidence has been detected and the next following data may be reproduced continuously.

Referring to FIG. 1, the disc 2 is rotationally driven by a motor 1, and a pickup 3 reads pits on the disc 2. Signals read from the disc 2 by the optical pickup 3 are rendered into binary signals (EFM signals) via an RF amplifier 4. The EFM signals from the RF amplifier 4 are transmitted to a decoder 6, while being transmitted simultaneously to a servo circuit 5. On reception of the EFM signals, the servo circuit 5 outputs rotation servo signals for the motor 1 and focusing and tracking servo signals for the optical pickup 3.

The decoder 6 demodulates and error corrects the EFM signals. That is, the decoder 6 detects frame synchronization signals (that is, EFM synchronization signals) by PLL-derived clocks (EFM bit clocks) which are based on the EFM signals. These frame synchronization signals are used for synchronizing the decoder 8. Demodulation of the EFM signals in the decoder 6 is effectuated on the basis of clocks derived from a quartz oscillator from an exterior circuitry. An output from decoder 6 is transmitted to RAM 8 via control circuit 7.

Meanwhile, in the present embodiment, data re read out from the disc 2 at a fast rate in a burst fashion in order to make compensation for possible data failure due to readout errors or focusing deviations. On the other hand, during this burst-like data readout, a sufficient amount of data to compensate for jitters in the PLL-derived clocks and the quartz oscillator derived clocks are read out with a partial overlap of say several samples. The above mentioned data readout is effected by a central processing unit (CPU) 9 controlling the motor 1 and the optical pickup 3 by means of the servo circuit 5. These partially overlapped data are transmitted to a terminal 71 of the control circuit 7 shown in FIG. 2.

Figure 2:
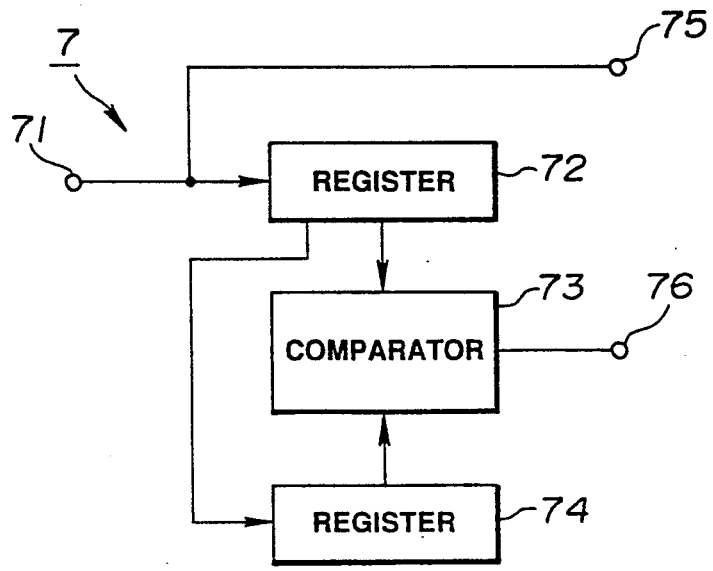
FIG. 2 is a block diagram showing a typical embodiment of a controlling circuit constituting a data reproducing apparatus according to the present invention.

The control circuit 7 includes registers 72, 74 for storing a predetermined number of samples of data from the disc 2 and sequentially shifting the stored data by one sample, and a comparator 73 for comparing data patterns of the data from the registers 72, 74, as shown in FIG. 2. The data supplied to the terminal 71 are transmitted via register 72 to register 74. The data from register 74 are transmitted to comparator 73, to which the data from register 72 are also transmitted. Since the data read out in a burst fashion from the disc 2 are partially overlapped data, as mentioned hereinabove, several trailing samples of data from the preceding burst signals are identical with several leading samples of data from the succeeding burst signals. The result is that the data from these registers 72, 74, compared in the comparator 73, are coincident only in the overlapped data patterns. An output of the results of comparison is transmitted to CPU 9 via terminal 76.

It is noted that the data supplied to terminal 71 of the control circuit 7 are also transmitted via terminal 75 to RAM 8. Data are written in RAM 8 in a burst fashion, as described above. Thus, after writing data of a given burst signal in RAM 8 has been terminated, and when data of the next burst signal are to be supplied to register 72, several data samples corresponding to several data samples at the trailing end of the preceding burst signal already stored in RAM 8 are left in register 74. Data writing in RAM 8 is started responsive to the results of comparison from comparator 73. That is, the controlling operation by CPU 9 is made so that, when the data patterns in the registers 72 nd 74 are coincident with each other, the next following data, that is the data directly succeeding the data containing the coincident patterns, are written in RAM 8.

Figure 3:
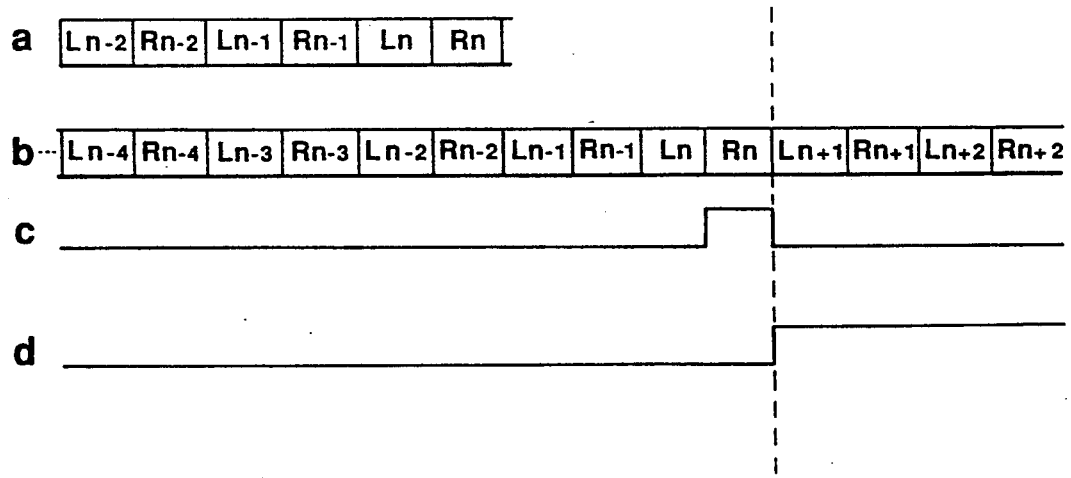
FIG. 3A through D is a diagrammatic view for illustrating the relation between sample data when combining the sample data before recording data in RAM.

FIG. 3 shows the relation between an output a from register 74, input data b to terminal 71, an output c from comparator 73 and write start timing d of RAM 8. In FIG. 3, data of a predetermined number of samples of from $L_{n-2}, R_{n-2}$ to $L_n$, $R_n$ are stored in register 74 and subsequently shifted so as tobe transmitted to comparator 73 from the sample $L_{n-2}$ first. In the comparator 73, data from register 74 are compared to data from register 72. If, in the comparison of the data patterns of the predetermined number of data samples from registers 72 and 74, the data patterns of from $L_{n-2}$ to $R_n$ thereof are found to be coincident with each other, a coincidence output c is outputted from comparator 73. On reception of the coincidence output c from comparator 73, the CPU 9 starts to control the data to be written in RAM 8 from the data sample $L_{n+1}$ on.

By causing data next to the data containing coincident data patterns to be written in RAM 8, as described above, correct data connection may be obtained in RAM 8, even if a time difference due to jitter should be produced between the subcode data based on the PLL derived clocks and the main data based on the quartz oscillator derived clocks, so that data overlap or dropout is not produced. As a result, substantially faultlessly contiguous audio signals maybe obtained. Meanwhile, the number of samples in the registers 72 and 74 needs only to be selected so as tobe smaller than the number of samples subject to fluctuations due to jitter and so as not to be large enough to cause mistaken detection of data connections.

Data read from RAM 8 are converted by a digital-/analog (D/A) converter 12 into analog signals which are outputted via lowpass filter (LPF) 13 as audio signals at an output terminal 20.

Meanwhile, the CPU 9 is supplied with signals from a keyboard 10 and adapted for controlling a display, not shown.

In the above embodiment, data readout in a burst fashion from the disc 2 are connected correctly at the stage of data writing in RAM 8. However, data may also be connected at the stage of data reading from RAM 8, as will be explained hereinbelow.

By connecting data at the stage of data writing in RAM 8, as described above, continuous data may be obtained substantially faultlessly from the practical point of view. There is however the risk that data connection errors may be produced when data from the disc 2 contains a succession of data zeros or a succession of unusually low level data. In the above embodiment, there is substantially no problem in sound continuity even although mistakes in data connection should be produced so that no unnatural hearing sense may be aroused. However, there is the risk that a time base deviation be produced at the data connecting portions. The same risk may be produced in the case of certain digitally combined periodic sounds.

For coping with the even of a succession of digital zeros or of unusually low level data, the following measures may be taken in the data reproducing apparatus of the present invention.

Thus, it may be presumed that, even though a time difference should exist due to jitter between the PLL derived clocks and the quartz oscillator derived clocks, the amount of the time difference is not so outstanding insofar as there are no particularly severe disturbances. On the other hand, considering that the two clocks are usually deviated to a small extent relative to the center of phase locking, the point of comparison of the data patterns is sequentially swung by e.g. one point in temporally preceding and succeeding directions with a customary takeout point as the center of swinging. In this manner, even if the same data patterns are repeated, that is, digital zeros or unusually low level data are repeated despite the fact that these data are in effect other than the digital zeros or the unusually low level data, the risk of mistaken detection may be diminished significantly.

Figure 4:
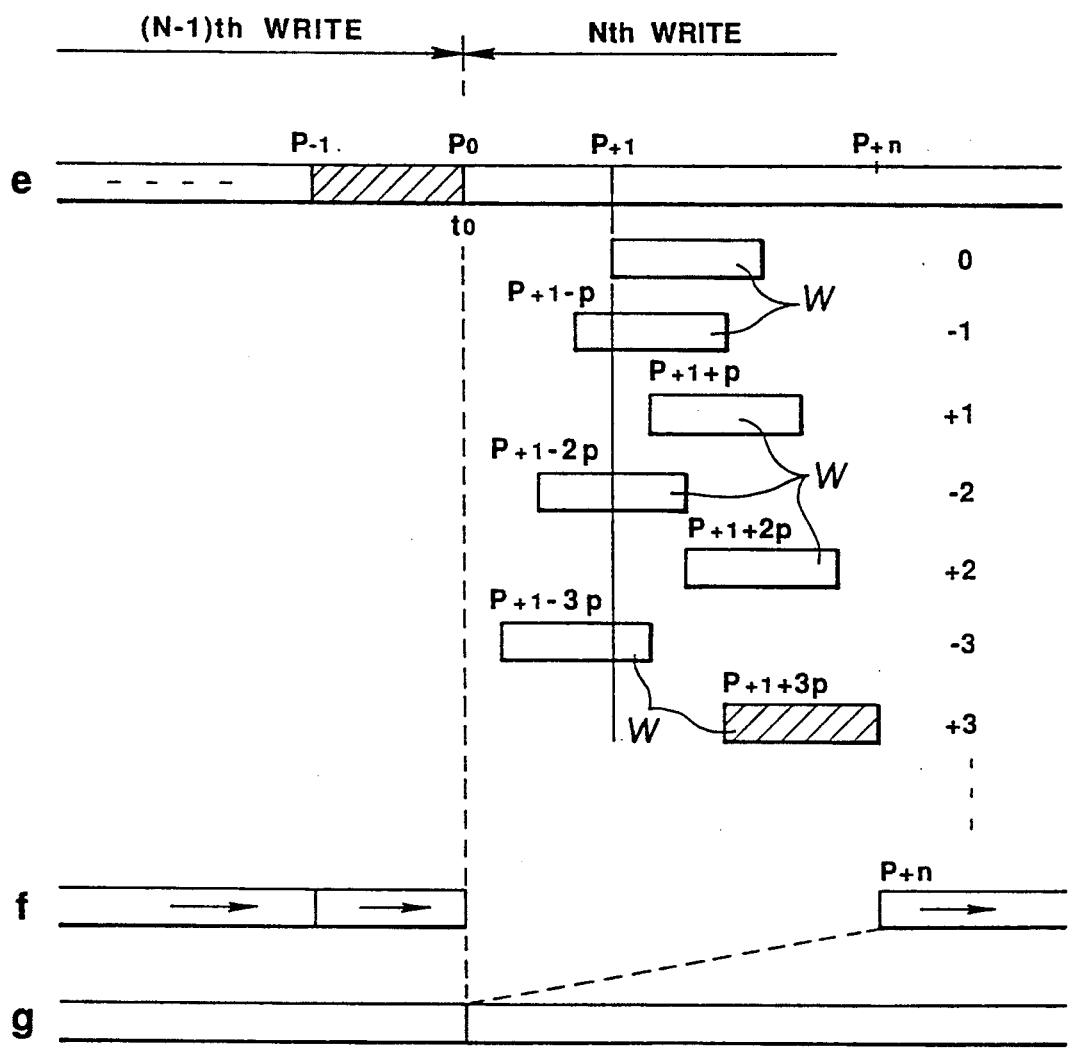
FIG. 4 is a diagrammatic view for illustrating the status of combination of data being read from RAM.

FIG. 4 shows the state of data pattern comparison with sequential point swinging. In the present example, shown in FIG. 4, data are written in RAM 8 with data overlap sufficient to compensate for jitter. When the data are read about from RAM 8, the point of comparison is swung on both sides of a center of swing, that is, in the temporally lagging and leading directions, as mentioned hereinabove. The data pattern of a connecting portion is compared with that of a window of the same size and, in the event of coincidence, data start to be read at a point directly following the coincident data portion.

It is assumed that, in FIG. 4, data up to point $P_O$ of an input data train e has been stored in RAM 8 by (N−1)th data writing (the preceding burst signal writing), and that data partially overlapped with the at a written by the (N−1)th writing has also been written by the Nth writing (next burst signal). It is then checked, by comparison with a window W of the same width as a data sample of the predetermined width, whether there is a data pattern in the data train downstream of the point $P_O$ stored by the Nth writing which is the same as the data pattern of the points $P_{-1}$ to $P_O$. For example, the leading position of the window W is placed at a point $P_{-1}$, that is the takeout point, of the data stored by the Nth writing, before starting the comparison. The window W is swung in the temporally leading and lagging directions by a desired width p to search for data having the same pattern as the data of the points $P_{-1}$ to $P_O$. That is, the window W is sequentially swung so that the leading position thereof is at data points $P_{+1} -p$, $P_{+1} +p$, $P_{+1} -2p$, $P_{+1} +2p$, $P_{+1} -3p$ and $P_{+1} +3p$. In the example of FIG. 4, data having the same pattern as that of the points $P_{31\ 1}$ to $P_O$ is found when the window W is moved to the position of $P_{30\ 1} +3P$. When the data of the same pattern is found, address data in RAM 8 of the position of the trailing point $P_{+n}$ of the window W at the $P_{+1} +3p$ position are stored in a separate address control area so that the data may be read out during reproduction on the basis of these address data. That is, when data are read from RAM 8, address control is made so that data reading is skipped from the point $P_{+n}$ so that data reading may be started from the point $P_{+n}$. In this manner, data f may be read from RAM 8 so that the data at the point $P_{+n}$ is contiguous to that at time $t_O$ at point $P_O$ to assure accurate data connection free from data overlap or data dropout.

With the above described present, when data are read in a burst fashion from the disc 2, data (main data) are compared before and after the data connecting portion so that data next following the coincident portion are written in RAM 8, or alternatively, data are previously written in RAM 8 with an amount of overlap wide enough to compensate for jitter and data stored in RAM 8 before and after the connecting portion are compared, with the coincident data being read out, so that there is not risk of main data overlap or dropout irrespective of jitter. In this manner, sound skipping is not produced even when the sound reproducing apparatus is subjected to vibrations during reproduction to assure vibration-proofness of the reproducing apparatus. Main data and auxiliary data may be red apparently in the same manner as conventionally and the apparatus of the present invention may be implemented simply by addition of the control circuit 7 so that conventional circuitry, such as integrated circuits, may be used directly without renewed circuit designing with saving in production costs.

What is claimed is:

1. A data reproducing apparatus for reproducing main data from a disc on which a data string comprised of said main data and auxiliary data appended to said main data at intervals of predetermined lengths of the main data, said main data being previously error correction coded input digital data, to data reproducing apparatus comprising:

error correcting means for separating said main data from said data string read from said disc for effecting error correction on the separated main data, a first memory for sequentially storing an output from said error correction means, readout control means for continuously outputting data stored in said first memory;

comparator means for comparing data patterns of main data portions previously stored in said first memory and main data portions to be entered next to said first memory for detecting coincidence therebetween, and memory control means for causing the main data portions entered next to the first memory to be stored in continuation to the main data portions previously stored in said first memory at a time point of coincidence detection.

2. A data reproducing apparatus as claimed in claim 1 wherein said error correction means comprises a second memory in which the main data are written by clocks reproduced from the main data and from which the main data are reproduced by reference clocks.

3. A data reproducing apparatus as claimed in claim 1 wherein said comparator means comprises a first register for sequentially predetermined number of trailing samples of the latent data written in said first memory, a second register for sequentially storing a predetermined number of samples of data outputted from said error correction means and a comparator circuit for comparing data patterns stored in said first and said second registers for detecting coincidence of the data patterns.

4. A data reproducing apparatus as claimed in claim 1 wherein data writing in said first memory is effected at a faster rate than a data readout rate from said first memory.

5. A data reproducing apparatus as claimed in claim 4 wherein data readout from said disc is terminated when the main data stored in said first memory exceeds a first predetermined volume and wherein data readout from said disc is again started when the data volume stored in said first memory is less than a second predetermined volume.

6. A data reproducing apparatus as claimed in claim 5 wherein a readout position on said disc is controlled so that the data are read about again from said disc so that a predetermined number of samples thereof are overlapped with the latest data stored in said first memory.

7. A data reproducing apparatus for reproducing main data from a disc on which a data string comprised of said main data and auxiliary data appended to said main data at intervals of predetermined lengths of the main data, said main data being previously error correction coded input digital data, the data reproducing apparatus comprising error correction means for separating said main data from said data string read from said disc for effecting error correction on the separated main data, a first memory for sequentially storing an output from said error correction means, readout control means for continuously outputting data stored in said first memory, reproduction control means for controlling data readout from said disc so that data previously stored in said first memory are partially overlapped with data to be stored next in said first memory, and comparator means for sequentially comparing a predetermined number of trailing samples previously stored in said first memory and the same predetermined number of leading samples of data to be stored next in said first memory for detecting coincidence of data patterns, an address of said first memory on detection of coincidence of the data patterns being stored, said main data being red out from said address in continuation to the end of readout of the previously stored main data.

* * * * *